3,051,435
VALVE
William H. Ramsey, Houston, Tex., assignor to
C. K. Stillwagon, Houston, Tex.
Filed May 27, 1959, Ser. No. 816,223
1 Claim. (Cl. 251—306)

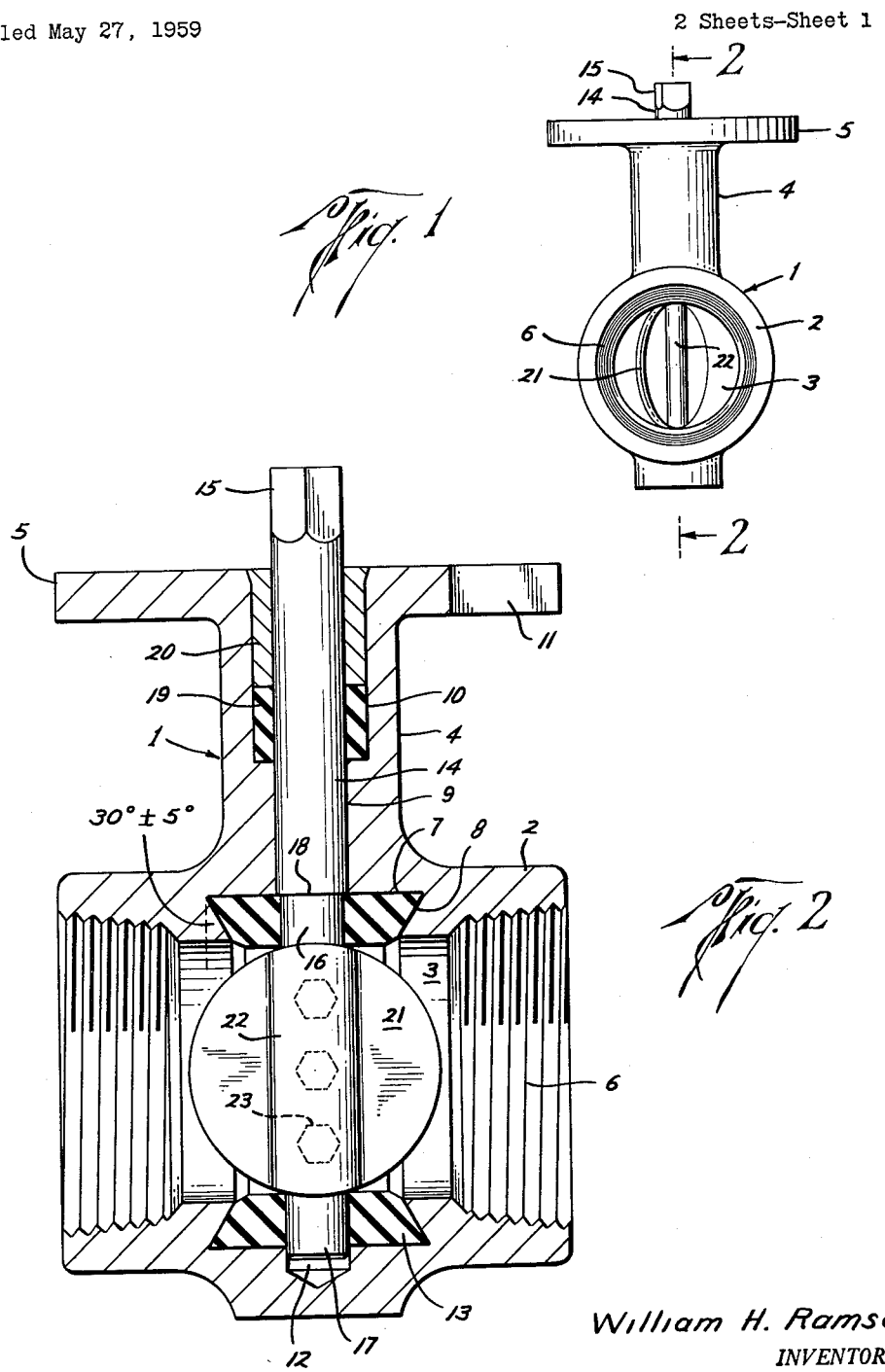

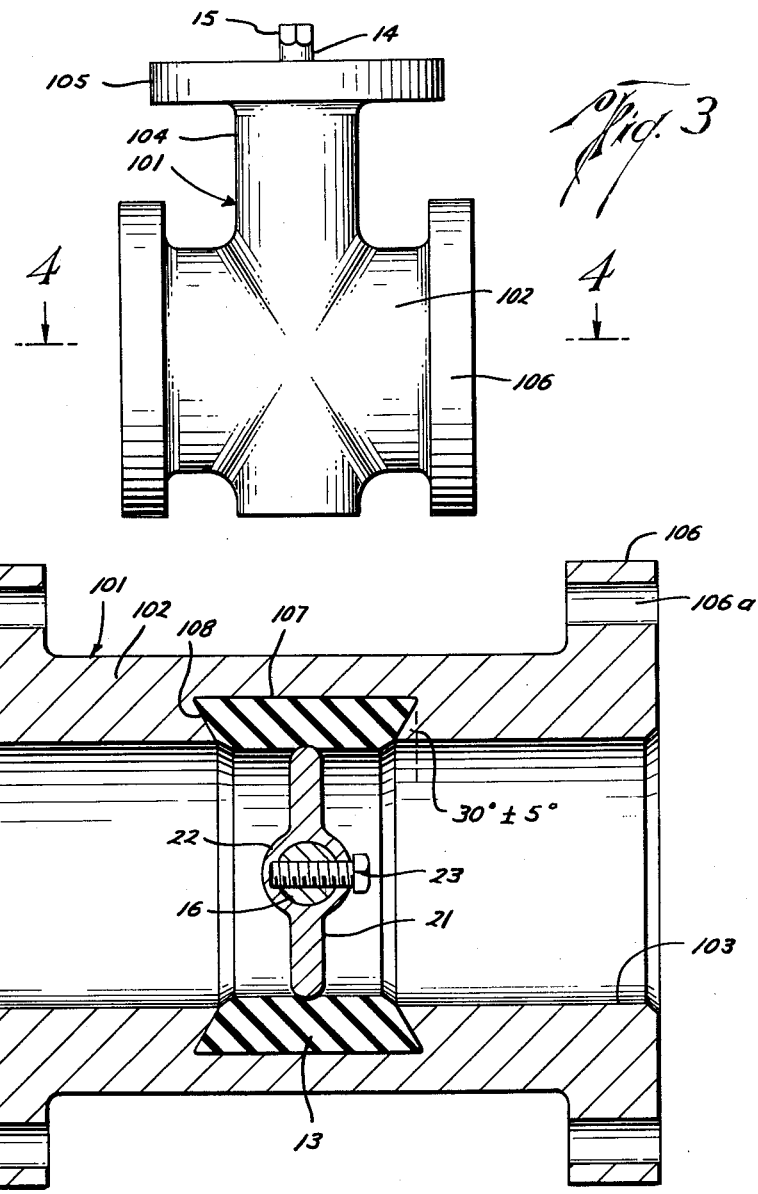

This invention relates to the improvements in valves and refers more particularly to valves of the character known as butterfly or disc-type valves.

The valve of this invention is particularly adapted for use in pressure ranges up to approximately 150 p.s.i. and even higher, and the valve is usable in suction lines as well. In such valves, it is particularly desirable that the valve be economical, readily installed in the conduit to be controlled, and easily maintained by replacement of the wearable parts. Such valves have been made in the past which utilize a dovetail groove to retain a dovetail shaped seat in place within the body. These valves have either had to have a snap ring along each edge of the seat to assist holding the seat in place or have had a metal backing or a stiffening means within the seat itself for retaining the seat within the dovetail groove to prevent displacement under service conditions, particularly in suction service. This stiffening of the seat increases the difficulty in installing and replacing the seat and also increases the possibility of damaging the seat during these operations.

Some valves have been designed to avoid the use of auxiliary retaining means by using only a dovetail groove for retaining the seat in place. These valves generally are provided with a body having a groove with sides inclined with respect to a plane normal to the flow axis at an angle of 45 degrees or more. Such body is split into two portions along a parting surface dividing the dovetail groove so that the seat may be inserted within one part of the groove with the body sections separated and the body sections then drawn together compressing the seat between them and secured to each other. Thus, in the prior art valves for use in both pressure and suction services having dovetail grooves for retaining similarly shaped seats either have had auxiliary seal retaining means or have had the body formed with a dovetail groove with such steeply inclined sides thought necessary to retain the seat, and made in sections parting from each other along the groove so that the dovetail shaped seat with steeply inclined sides corresponding to those of the groove might be inserted within the groove and then the body sections placed in position for compressing and retaining the seat.

It is an object of the present invention to provide a disc valve wherein a unitary body releasably secures a readily replaceable resilient seat member sufficiently well to enable its use in vacuum service without auxiliary seal retaining means.

Another object is to provide a disc valve in which a resilient seat member is positively held in position in a unitary valve body without the necessity of being bonded to the valve body so that the seat member is readily replaceable and yet in which the valve may be used in suction as well as pressure systems.

Another object is to provide in a disc valve a resilient seat member which will be positively held in place in either pressure or suction systems without the use of auxiliary clamping means for securing the seat.

Another object is to provide a disc valve in which a resilient seat member and the valve disc can be very quickly replaced in the event of failure due to wear of the parts.

A further object of this invention is to provide a simple valve in which a minimum number of moving parts is employed and which is versatile in that it may be secured in a conduit in any of the usual manners without the requirement of special parts other than a type of connection suited to the manner in which it is to be secured in the conduit.

These and other objects will become apparent when read in conjunction with the following detailed description and the attached drawings of certain preferred and illustrative embodiments of the invention, wherein:

FIG. 1 is an end elevational view illustrating a valve embodying this invention and provided with threaded connections for connecting it in a conduit;

FIG. 2 is a section taken along line 2—2 of FIG. 1;

FIG. 3 is a side elevational view of a valve embodying this invention provided with flange connections for connecting it in a conduit; and FIG. 4 is a section taken along the line 4—4 of FIG. 3.

In accordance with this invention, a dovetail groove is provided in the body of this valve for receiving a resilient seat. The undercutting of the sidewalls of the groove in the body provide the means for retaining the seat against unintentional displacements during use. The use of a dovetail seat groove with sides on a small angle has been found unsuitable for certain service because if the groove be made wide enough and the seat soft enough so that the seat would efficiently cooperate with the valve disc, the groove would not retain the seat against even a slight vacuum. However, it has now been discovered that there is a narrow range within which the side walls of the groove may be at an angle great enough to retain a seat of the necessary dimensions and softness in use but not so great as to make insertion and removal of the seat impractical when the valve member is not present.

Of course theoretically the side angle necessary to retain a seat in a groove varies with the hardness of the seat and its width and thickness but as a practical matter must be geared to practical values of those factors. A seat should be as hard as possible consistent with deflection by the edge of the disc without excessive torque in closing the valve, because the softer the seat the less pressure the valve will hold when shut. A hardness of 60–65 durometer is as high as practical for hand operated valves of the 2" to 8" sizes. In the 3" to 8" sizes a seat thickness of 0.42" has been found approximately optimum to permit ease of disc operation without danger of pressure bypassing by deflection of the seat, and a width of seat exposed to the interior of the valve body of approximately 1.1" sufficient for efficient operation in 4" and 6" valves. For 3" valves not so great a width is necessary since the disc rim swings on a shorter radius, 1.05" being found sufficent. On the other hand 8" valves desirably use a wider seat, of the order of 1.75" because of the flatter angle of approach of the edges of the disc to the seat as it moves along its longer radius in turning. However, it has been found that in order to achieve sufficient flexibility for insertion of a seat into a 2" valve with the limited space within the body, a thinner seat, approximately 0.24" was required, along with a little more width.

Even over these ranges of dimensions of seats and nominal sizes of valves, dovetail grooves and seats with sides within the range provided by this invention have been found effective to retain the seats in place in use. Actually, with the hardness and dimensions of seats within optimum ranges, a side angle within the range provided by this invention will serve to retain the seat in use, and still allow for its insertion and removal when desired.

In accordance with this invention, the sidewalls of the groove in the body are each undercut at an angle within the range of 25 to 35 degrees, preferably 30 degrees, to a plane normal to the flow axis. This suffices to retain the seat within the groove without auxiliary seat retaining means such as bonding agents, reinforcing wire on backing plates without rendering insertion and removal of the seat too difficult to be practical. This method of retaining the seat provides for ease in replacement of a seat when necessary due to wear or other defects. The stem and valve member may be removed from the valve and the defective seat may then be pried out of its groove and withdrawn from the body through the flow passage. A new seat may then be inserted through the flow passage of the body and worked into the groove and the stem and valve member replaced. The other operative elements may be replaced when necessary with only a minimum number of operations and without the use of any special tools.

Referring now more in detail to the drawings and particularly to FIGS. 1 and 2 thereof, there is illustrated a valve of the disc type having a valve body generally designated at 1 with a main portion 2 having a fluid passageway 3 extending therethrough and having a stem 4 projecting laterally from the main portion 2 and of much smaller outer diameter, with a flange 5 on its outer end. The stem portion 4 of the body, sometimes referred to as the neck, may be long or short depending on the service in which the valve is to be employed, and the flange 5 on its outer end constitutes merely one way of indexing the operating mechanism of the valve as will more fully appear hereinafter.

The main portion of the body 2 at the opposite end of the flow passageway 3 therethrough is provided with suitable means such as the internally threaded sections 6 whereby the valve body may be connected into a conduit through which it is to control the flow.

Intermediate its ends the flow passageway 3 is interrupted by a groove formed in the walls of the passageway and extending around the passageway so that it opens into the passageway. This annular groove is of dovetail cross section as shown at 7 and has its side walls 8 tapered so that the groove is wider at its portions more remote from the passageway 3 than at its opening into such passageway. The angularity of these side walls is of great importance in this invention to the degree and for the purposes presently to be explained.

Within the neck 4 is provided a bore 9 extending longitudinally through the neck in a direction substantially normal to the flow path through the passageway 3 and intersecting that passageway substantially midway between the extremities of the groove 7. At its outer end this bore 9 is counterbored at 10 from the outer end of the neck partway through the neck toward the groove 7.

The flange 5, if employed, may be provided with a notch 11 for purposes presently to be explained.

In the bottom of the groove 7 at a point in axial alignment with the bore 9 the body is also provided with a bearing recess 12 which in the instance shown extends only partway through the wall of the body.

Disposed within the groove 7 and retained therein is a resilient seat 13. This resilient seat 13 is of annular form and is of trapezoidal cross-sectional shape the longest side of the trapezoid being disposed radially outermost and the shorter parallel side radially inwardly and with the end faces of the seal at the same angle as the sides of the grooves 7. It is of a size to fit tightly within the groove 7 so that when forced into the groove it will conform to the inner surface of the groove in every detail and be slightly under compression therein. Thus it will be retained tightly with the groove.

The valve stem 14 having a non-circular portion 15 on its upper end for the purpose of receiving a wrench for turning the stem is rotatably mounted within the bore 9 and has a reduced diameter portion 16 extending through aligned openings in the seat 13 with its lower extremity 17 pivotally mounted in the bearing recess 12 in the body. This reduced diameter portion of the stem is of such size relative to the openings therefor in the seat 13 that it fits tightly within such openings and the seat 13 provides a seal about the stem where it passes through such openings. The juncture of the main portion of the stem 14 with the reduced diameter lower portion 16 provides a downwardly facing shoulder 18 which is preferably located so that it bears against the outer surface of the seat 13 on the side adjacent the main portion of the stem 14.

Within the counterbore 10 in order to provide an additional seal and bearing for the stem 14, there is provided a packing or seal element 19 which may be of the pressure energized variety or otherwise as desired, and which is held in by suitable means such as the gland ring 20.

Disposed within the flow passageway 3 is a valve disc 21 of such size that when forced into the interior of the seat 13 it will slightly distort the inner surface of this seat to provide a compressed area around the edges of the disc 21. The disc valve member 21 is provided with an enlarged portion 22 extending diametrically thereof and bored to receive the reduced diameter portion 16 of the stem which projects therethrough, thereby rotatably mounting the disc valve member on an axis which is parallel to the plane of the disc and normal to the flow axis and at the same time intermediate the ends of the seat receiving dovetail groove 7. The disc valve member 21 may be retained in place on the stem 14 for rotation therewith by any suitable means such as, for example, by means of capscrews 23 threaded from the exterior of the disc valve member through the enlarged portion 22 thereof and into the reduced diameter portion 16 of the stem 14 within the disc valve member.

The mounting of the wrench or arm for turning the valve stem is not illustrated and may be of any suitable desired variety such as, for example, that shown in United States Patent No. 2,740.423, issued April 3, 1956, to C. K. Stillwagon. As such it forms no part of this invention.

As previously emphasized, the resilient annular seat element 13 is of such size and dimensions that it must be slightly distorted in order to fit within the groove 7 and when so distorted and placed within the groove will extend itself to completely conform to the inner surface of the groove and thereby be retained within the groove. It is also of such size and proportions that when the disc valve element 21 is placed within it, the resilient seat 13 will also be slightly distorted around the edge of the disc valve element where it engages the seat, thereby placing the seat under slight compression along the edges of the disc valve element so as to seal thereabout when the valve is in closed position.

In an effort to provide a resilient seat in a valve of this character such that the seat could be readily removed and replaced when the disc valve element is out of the valve, and yet such that the seat would be retained firmly in position in the groove 7 when the disc valve element 21 is in place and the valve in use, even in vacuum service, it was conceived that the key to the solution of such a problem was in the proper degree of angularity of the side walls 8 of the groove 7.

After building and testing many valves, it was found that when such side walls of the groove were formed at a greater angle to a plane normal to the flow axis than 35 degrees, it was so difficult as to be impractical to remove a seat of the required hardness, width and thickness even when the disc valve element 21 was out of the valve. However, at such time as the said angle was 35 degrees or less, the seat element could be removed with reasonable facility, the facility for removal increasing with decrease of such angle.

Upon trial of such valve in actual service it was found that particularly in vacuum service the seat would not be retained within the groove 7 with sufficient security, especially during vacuum service, if the angle above mentioned were made less than 25 degrees, but that with the angle 25 degrees or greater the seat was with sufficient security retained in the groove as long as the valve disc member 21 remained in place within the valve.

Further tests indicate that the optimum angle for greater facility of removal of the seat when desired and for the greater security of retention of the seat in use was an angle of 30 degrees.

Turning now to FIGS. 3 and 4, there is illustrated a valve quite similar to that shown in FIGS. 1 and 2 except that instead of being provided with internally threaded zones 6 for connecting it with a conduit whose flow it is to control, the valve shown in FIGS. 3 and 4 is provided with a flanged connection for connecting it in such conduit.

In FIGS. 3 and 4 the valve body is generally designated by the numeral 101 with the main portion of the body indicated as 102. The flow passageway through the body is shown at 103 and the laterally extending neck 104 is in all respects substantially similar to the neck 4 of FIGS. 1 and 2 and has a flange 105 on its outer end which may be identical with the flange 5 on the outer end of the neck 4.

In place of the threaded connections 6 shown in FIGS. 1 and 2, the valve of FIGS. 3 and 4 is provided with flanges 106 on the opposite ends of the main portion 102 of the valve body, these flanges preferably having bolt holes 106a at circumferentially spaced points so that they may be readily secured to similar flanges on the ends of the conduit into which the valve is to be inserted.

In like manner as the valve of FIGS. 1 and 2, the body 101 is provided midway of the flow passageway 103 with an annular recess or groove 107 whose side walls 108 are inclined to form the groove into a dovetail shape. The inclination of these side walls is the same as described in connection with FIGS. 1 and 2, being within the range of 25 degrees to 35 degrees with an optimum of 30 degrees.

In the valve of FIGS. 3 and 4, the same resilient valve seat 13 may be employed as is shown in FIGS. 1 and 2 and likewise the same valve stem 16 and valve disc 21 with diametrical enlargement 22 secured on the valve stem by means of capscrews 23 or the like.

In both of the embodiments illustrated, the flow passageway through the valve body is opened and closed by a quarter-turn rotation of the stem and consequently of the disc 21. Obviously, when the disc 21 is in a plane parallel to the flow axis the valve will be in open position and when the valve disc is in a plane normal to the flow axis the valve will be closed. When in this latter position the diameter of the disc is such as to deform the inner surface of the resilient seat 13 and provide a pressure area about the edge of the disc 21 within this seat, thereby securely sealing the valve in its closed position.

When it is desired to replace the valve seat 13 for any reason, the capscrews 23 may be removed, the valve stem 14 withdrawn through the neck 4 and the valve disc member 21 then withdrawn through the flow passageway. With the valve stem 14 and valve disc 21 withdrawn full access may be had through the flow passageway to the valve seat 13 and it will be found that with the angle of the side walls of the dovetail groove and seat within the range above indicated, the valve seat may be readily removed from its groove and taken out through the flow passageway. Thereupon a new valve seat may be inserted and the assembly completed by putting the valve disc and stem back in the reverse order and securing them with the capscrews 23.

When in service, even in vacuum service, with the disc member 21 in place and the valve stem 14 extending therethrough, it has been found that the valve seat will remain securely in position as long as the angularity of the side walls of the groove are within the range indicated.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claim.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

A disc valve in a size range equivalent to approximately two inch through eight inch internal diameter comprising a unitary valve body having a flow passageway therethrough, said body having an annular seat receiving dovetail groove in the valve body opening into and surrounding the passageway intermediate its ends, said groove having each side wall undercut in the body at an angle within the range of 25 to 35 degrees relative to a plane normal to the flow axis through said body, a disc valve member removably and rotatably mounted within the body on an axis parallel to the plane of the disc and normal to the flow axis and intermediate the ends of said groove for controlling flow through said passageway, and an annular resilient seat free of metallic reinforcement mounted in said groove and cooperating with the valve member to control flow through the passageway, said seat having a hardness in the range of approximately 60–65 durometer, a thickness in the optimum range of approximately 0.24 inch through 0.42 inch, and a width exposed through the open face of the groove in the range of approximately 1.05 inches through 1.75 inches, and substantially filling the groove so as to be deformed by the edge of the valve member when said member is in closed position, and, with said valve member removed, to be deformed sufficiently for insertion into and removal from said groove.

References Cited in the file of this patent

UNITED STATES PATENTS

| Re. 23,613 | Danks | Jan. 13, 1953 |
| 1,977,351 | Phillips | Oct. 16, 1934 |
| 2,936,778 | Stillwagon | May 17, 1960 |

FOREIGN PATENTS

| 213,184 | Australia | 1958 |